Sept. 6, 1938.  R. CHILTON  2,128,986
FLEXIBLE CONTROL TERMINAL
Filed Feb. 15, 1936   2 Sheets-Sheet 1
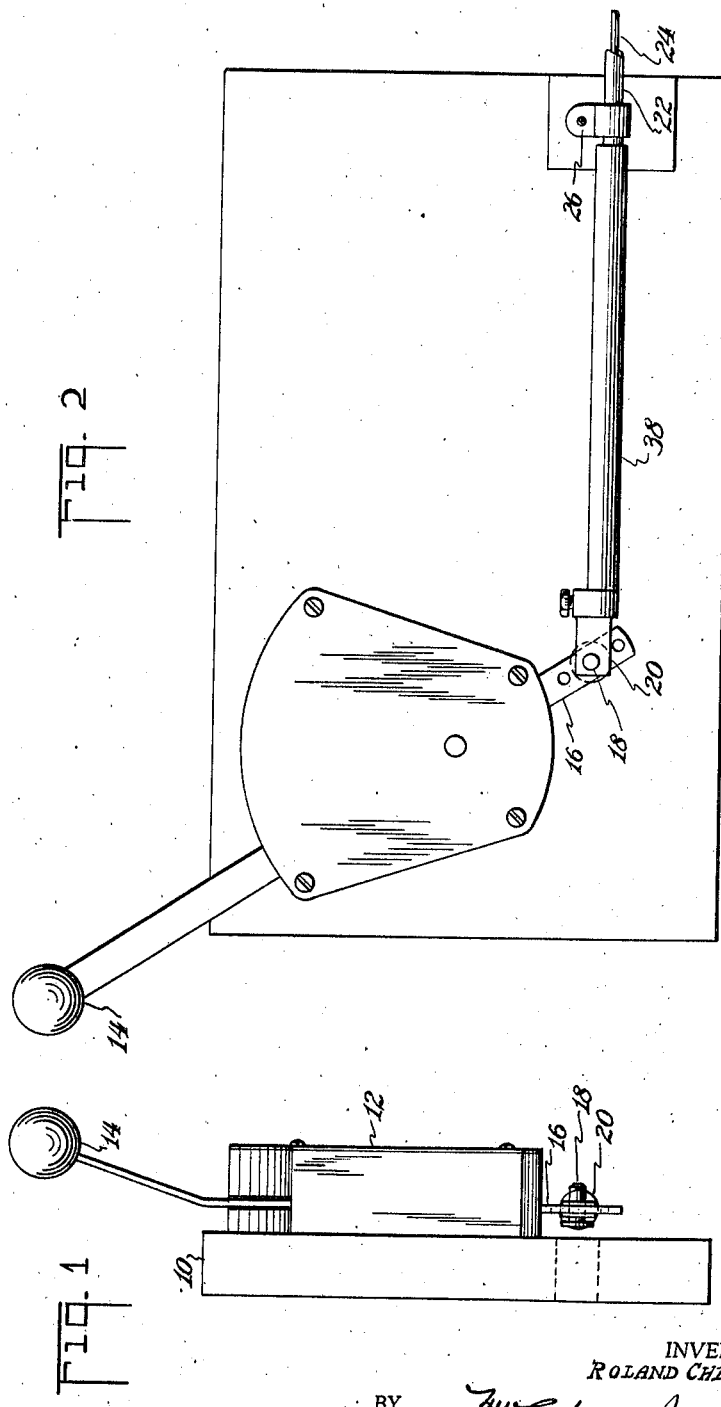
INVENTOR.
ROLAND CHILTON
BY
ATTORNEY.

Sept. 6, 1938.    R. CHILTON    2,128,986
FLEXIBLE CONTROL TERMINAL
Filed Feb. 15, 1936    2 Sheets-Sheet 2
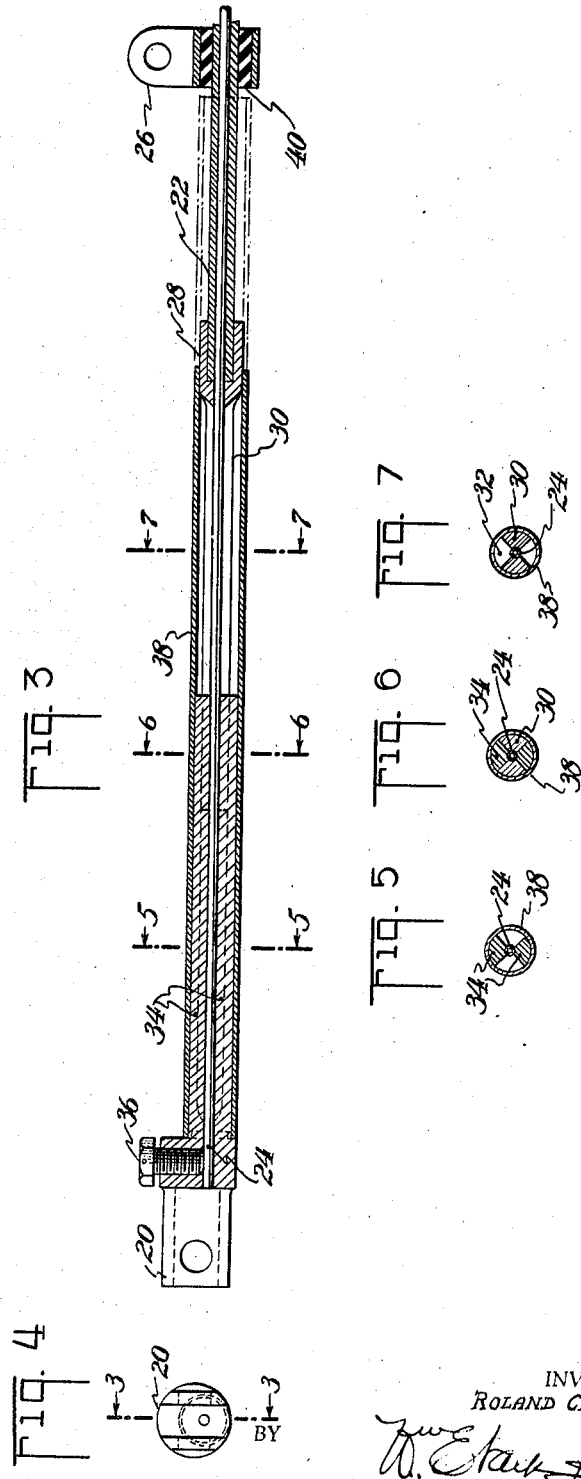
INVENTOR.
ROLAND CHILTON
BY
ATTORNEY.

Patented Sept. 6, 1938

2,128,986

UNITED STATES PATENT OFFICE 2,128,986

FLEXIBLE CONTROL TERMINAL

Roland Chilton, Ridgewood, N. J., assignor, by mesne assignments, to Wright Aeronautical Corporation, Paterson, N. J., a corporation of New York Application February 15, 1936, Serial No. 64,046

12 Claims. (Cl. 74—501)

This invention relates to the transmission of control movement from a manual, or other control lever to a remote means to be controlled.

In large airplanes having multiple power plants, for example, the control connections have usually to be led around a number of corners involving a large number of rods and levers, and/or pulleys and wires. Each different installation requires a different layout and the parts are often inaccessible and difficult of adjustment and maintenance, and have also given considerable trouble due to development of slackness from wear or distortion.

Objects of this invention are to overcome these difficulties and to provide a flexible type of control conduit which may be easily laid down regardless of the conformation of the path to be followed. In the prior art it has been sought to solve this problem by means of a wire running through a tube which could be bent into position, but the difficulty has been that, where the wire issues from the end of the tube to engage the actuating and actuated means, there is (in extended position) a considerable exposed length of wire which is unsupported and therefore has very little compressive strength. Buckling of the wire at the end connections has been a difficulty which has caused this type of control to fall into disuse for aircraft and other service. Accordingly, another prime object of the invention is to provide novel means whereby the extending end of the wire is effectively guided, and supported throughout against buckling.

In the drawings:

Fig. 1 is a side elevation of the control end of the device;

Fig. 2 is a front elevation of the control end of the device;

Fig. 3 is a longitudinal section through the new end fittings of this invention;

Fig. 4 is an end elevation of Fig. 3; and

Figs. 5, 6 and 7 are sections on the lines 5, 6 and 7, respectively, of Fig. 3.

Referring first to Figs. 1 and 2, 10 designates diagrammatically a control panel on which is mounted a control assembly 12 pivotally mounting a hand lever 14 having a downward extension 16 to which is pinned at 18 a clevis 20 of the end unit which comprises a main part of this invention. The end of a usual conduit 22 containing a wire 24 is also seen in Fig. 2, the tube 22 being clipped to the control panel at 26. Referring now to Fig. 3, it will be seen that the conduit tube 22 extends through the clip 26 and is engaged by a fork member 28, conformed as seen in Fig. 7, to comprise two segmental limbs 30 which each embrace 90° of arc of the wire 24 whereby the wire is restrained from buckling. Engaged in the spaces 32 defined by the segmental forks 30 are similar forks of a companion telescopic member 34 integral with the clevis 20 and equipped with a binding screw 36 by which the member 34 is clamped for axial movement with the wire 24. The device is surrounded by a dirt excluding and guiding tube 38.

The end clamp 26 preferably includes a rubber bushing 40 or other means whereby the conduit 22 is free for the slight angulation necessary due to the arcuate path of travel of the clevis pin 18 when this is associated with a lever such as 16.

It will now be seen that the entire protruding length of the control wire 24 is at all points embraced and supported by the arcuate portions of either, or both of, the telescopic forks 30, 34 and that this supports the wire against buckling so that its compressive strength will be as great as its tension strength, thus affording adequate stiffness and eliminating the deflections and lost motion characteristic of the arrangements of the prior art where the wire is exposed for the length of its travel. It will also be noted that the entire device is closed against the ingress of dirt or loss of lubricant. It will also be seen that the telescopic forks 30, 34 and the surrounding tube 38 comprise a well guided assemblage free from twisting and binding, and one which ensures a direct thrust or pull at the associated lever when once the clamp 26 has been properly located. The conduit 22 may be made of coiled wire for installations where there is substantial movement between the clip bracket 26 and other similar clips located along the conduit, but for the more general case where these brackets are secured to a relatively rigid structure, the conduit is preferably made of soft metallic tubing of relatively thick wall which can be bent into positon by hand without kinking. A construction such as shown also makes possible the use of control wires 24 having great flexibility, such as stranded wire, adapted for very circuitous paths and relatively sharp bends. A double fork device such as that shown should be used at both ends of the conduit 22 where the device to be controlled requires such a degree of pressure that an exposed or unsuported wire would be apt to buckle under compression.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A remote control including in combination, a tubular conduit, a wire slidable therein, a telescoping fork secured to an end of the conduit and slidably embracing said wire, a second fork telescopically engaging the first and engaging the wire, means clamping the second fork for sliding with the wire, and means connecting said second fork to a means to be controlled.

2. In a cable and conduit type of control, a pair of slidably engaged telescopic forks surrounding the cable to prevent buckling and engaging respectively an end of the conduit and a means to be controlled, the latter fork being movable with the cable.

3. The combination with a cable and conduit type of control, of a pair of slidably engaged telescoping forks surrounding said cable to prevent buckling and engaging respectively an end of the conduit and a control means, the latter fork being movable with the cable, and a tube embracing said forks providing a guide and closer therefor.

4. A remote control comprising in combination, a flexible conduit for ease of installation, a wire slidable through said conduit, a first fork secured to an end of said conduit and slidably embracing the wire to prevent buckling thereof, and a second similar fork telescopically engaging the first fork and secured for movement with the wire.

5. The combination of a conduit and a control wire subject to variable extension from an end of said conduit, of a pair of members each having fingers slidably engaged between the fingers of the other and engaging the wire to prevent buckling thereof, said members being secured respectively to associated ends of the conduit and wire.

6. The combination with a conduit and a flexible control cable extending therefrom, of a combination of circumferentially spaced fingers embracing the exposed cable and attached to said conduit, and a plurality of similar stiff fingers within the spaces between said first fingers, slidable with respect to said first fingers, and movable with said cable.

7. The combination with a conduit and a flexible control cable extending therefrom, of a plurality of circumferentially spaced fingers embracing the exposed cable and attached to said conduit, a plurality of similar stiff fingers within the spaces between said first fingers, slidable with respect to said first fingers, and movable with said cable, and a guide member embracing all said fingers.

8. The combination with a conduit and a control wire extending therefrom, of means to prevent buckling of said wire comprising telescoping elements carried respectively by the wire and conduit, both said elements snugly engaging said wire to prevent bending or buckling thereof.

9. The combination with a relatively flexible control wire emanating from a conduit, of telescoping extendible stiff elements engaging the wire along its extended length for support thereof, one said element being movable with the wire upon extension thereof from the conduit and the other element being secured to the conduit.

10. In a cable and conduit control wherein a flexible cable projects from the conduit, a terminal assembly comprising a pair of telescoping forks each of which is relatively stiff as compared with the cable, said forks closely embracing the projecting cable to prevent buckling thereof, said forks being secured respectively to the end of said conduit and to the projecting cable.

11. As an article of manufacture, a pair of forked elements slidable upon one another, said elements having through, coaxial bores for the reception of a flexible wire.

12. Means for stiffening the end of a flexible cable extending from a conduit to endow the cable with the ability to be used as a push control without buckling of the cable comprising interengaging telescoping elements secured respectively to the conduit and cable, both said elements having contact with the cable throughout its extended part.

ROLAND CHILTON.